United States Patent [19]

Buschbom et al.

[11] 4,405,040
[45] Sep. 20, 1983

[54] RELEASABLE DRIVE APPARATUS

[75] Inventors: Floyd E. Buschbom, Long Lake;
Donald L. Henke, Maple Plain, both of Minn.

[73] Assignee: Veda, Inc., Long Lake, Minn.

[21] Appl. No.: 269,634

[22] Filed: Jun. 2, 1981

Related U.S. Application Data

[62] Division of Ser. No. 115,184, Jan. 25, 1980.

[51] Int. Cl.³ .................... F16D 11/00; F16D 21/00
[52] U.S. Cl. .................... 192/67 R; 192/48.8; 192/108; 464/157
[58] Field of Search .............. 192/48.8, 67 R, 108; 464/157

[56] References Cited

U.S. PATENT DOCUMENTS

| 1,241,118 | 9/1917 | Hoskins . | |
|---|---|---|---|
| 2,114,633 | 4/1938 | Hedges | 192/67 R |
| 2,146,623 | 2/1939 | Caroland | 192/67 R |
| 2,316,243 | 4/1943 | Hubbard | 464/157 X |
| 2,755,900 | 7/1956 | Seyfried | 192/55 |
| 2,917,019 | 12/1959 | Krueger | 192/67 R |
| 3,168,862 | 2/1965 | Clouser, Jr. | 99/421 |
| 3,901,483 | 8/1975 | Lasar | 259/41 |

FOREIGN PATENT DOCUMENTS 366703 1/1939 Italy .................... 192/108

*Primary Examiner*—Allan D. Herrmann
*Attorney, Agent, or Firm*—Burd, Bartz & Gutenkauf

[57] ABSTRACT

A mixer having an open top mixing box accommodating a pair of lower augers and a pair of upper paddle conveyors drivably connected to the augers. A power box pivotally mounted on one end of the mixing box is drivably connected to the augers with releasable drive connections. The power box is a motor driven power transmission assembly that can be disconnected from the augers and removed from the mixing box. A movable door associated with the bottom of the mixing box is used to selectively open and close a discharge opening allowing mixed and blended material to be discharged into a conveyor.

11 Claims, 15 Drawing Figures

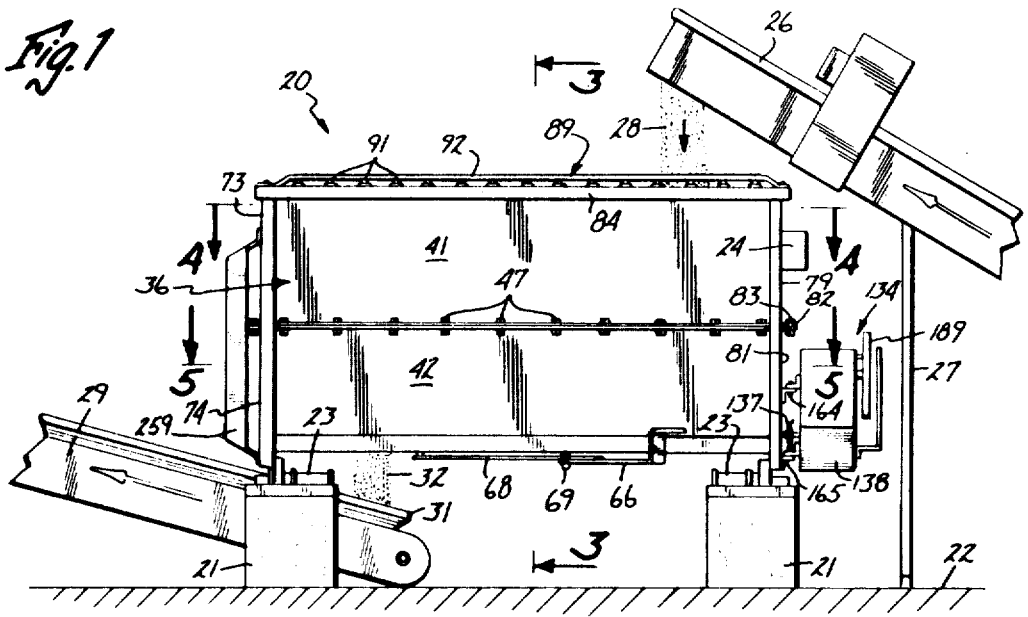
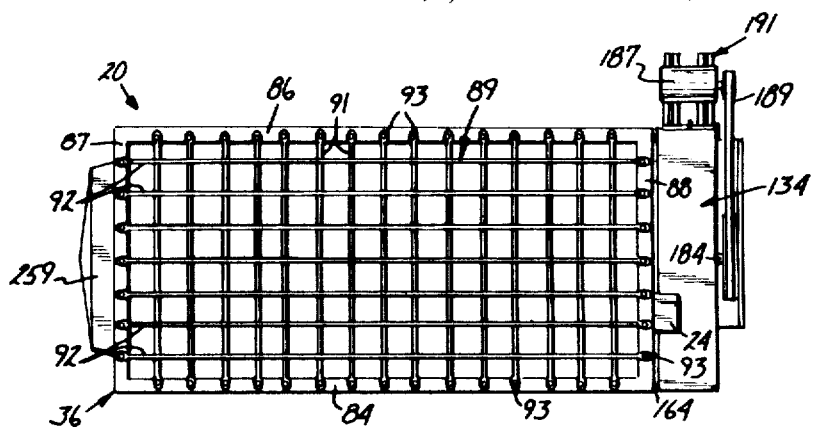
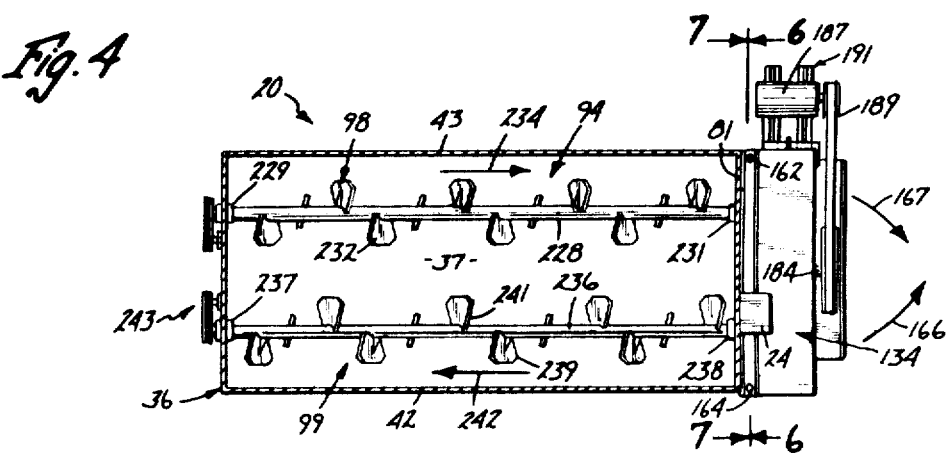

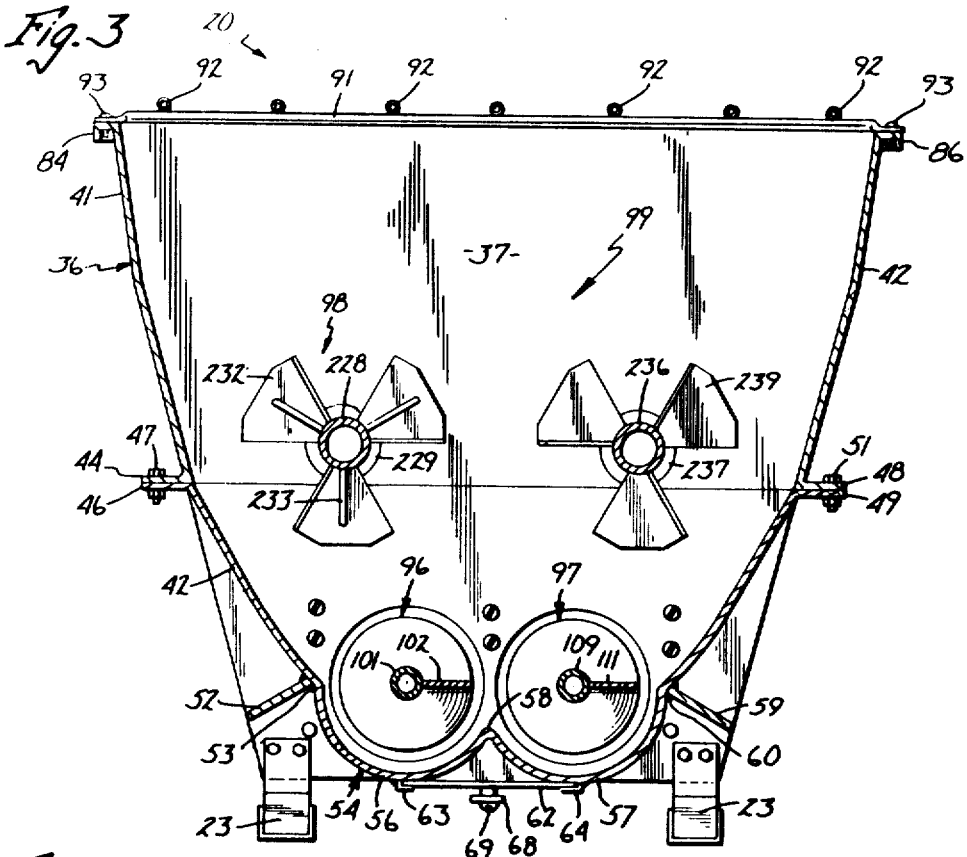

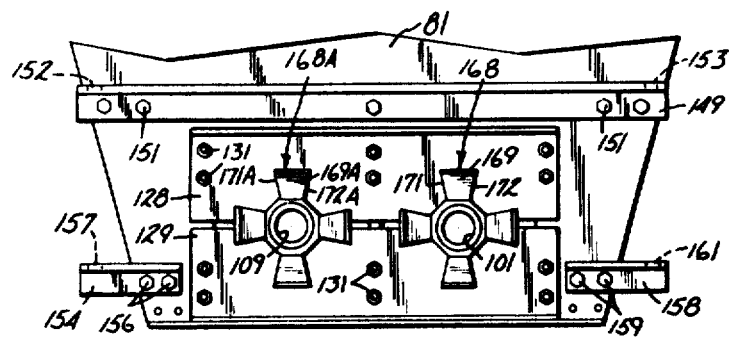
Fig. 6
Fig. 7
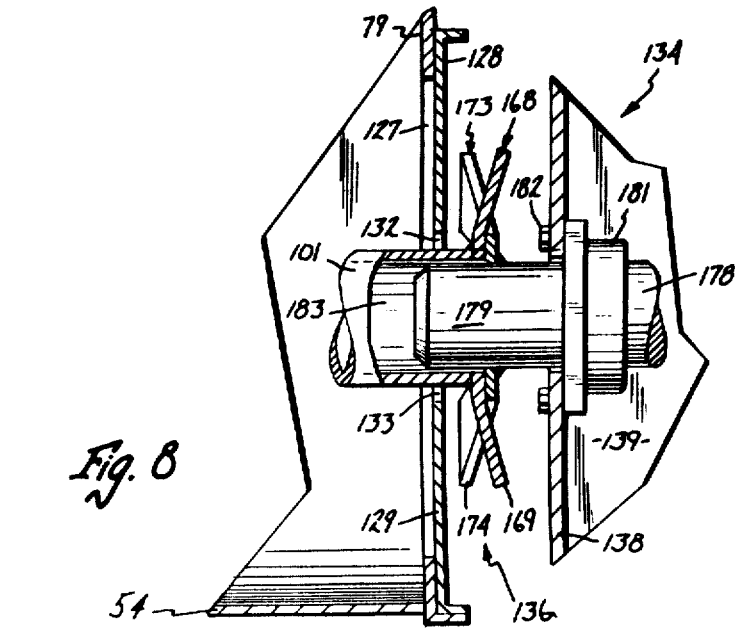
Fig. 8

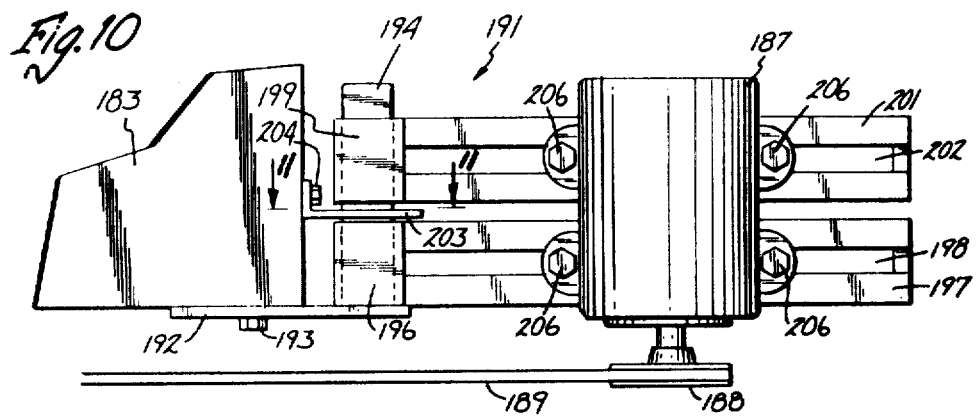
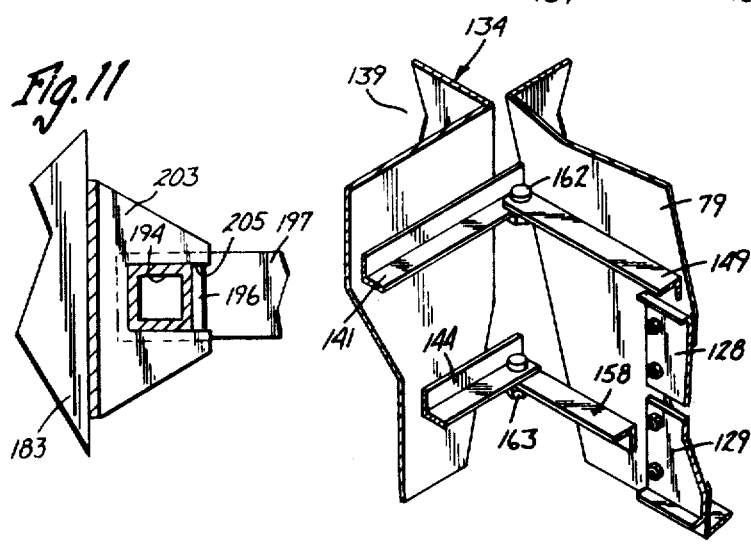
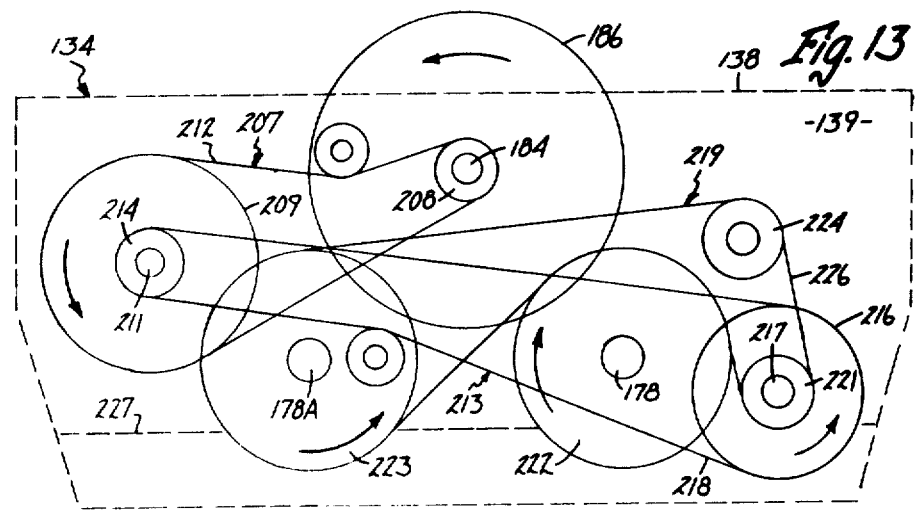

RELEASABLE DRIVE APPARATUS

This is a division of application Ser. No. 115,184 filed Jan. 25, 1980.

SUMMARY OF INVENTION

The invention relates to an apparatus for mixing and blending particulate materials, such as animal feed materials, including roughages and concentrates, into a consistent and uniform mixture of materials. The apparatus is an auger box mixer having an open top box surrounding a mixing chamber. Auger means are located along the bottom of the box to move the material longitudinally in the chamber. Paddle conveyor means are rotatably mounted on the box above the auger means and are driven to move material in the directions opposite the movement of material by the auger means. A power transmission means operatively connects the auger means with the paddle conveyor means, whereby the auger means and paddle conveyor means concurrently rotate in the chamber of the box.

A power box is movably mounted on the mixing box with releasable mount means. The mount means allows the power box to be removed from the mixing box or moved to positions allowing the removal of the auger means from the box. The power box is driven by a motor connected to the box with mount means. The power box includes power transmission means which transmits the power from the motor to output shaft means. Releasable drive connecting means associate the output shaft means with the auger means so that bending and deflection forces of the augers, as they rotate in the chamber, are only nominally transferred to the power box. The releasble drive connection means between the power box and the auger means allows the augers to independently flex and have a limited degree of movement without transmitting severe bending and twisting forces to the power box.

The conventional feed mixers are relatively large and unitized structures. They cannot be readily moved and assembled into a confined area, such as a feed room, as used in an installation for dairy cattle. The mixing box of the mixing apparatus of the invention is sectionalized and can be easily moved through a restricted space, or a doorway, and assembled into a confined area. The power unit, being a separate unit, can be moved through the restricted space and assembled to either end of the mixing box. The motor mount on the power box can be mounted on either side of the power box so that the mixing apparatus can be located in a selected location, such as adjacent a wall.

The mixing box can be mounted on stationary supports or a movable portable support, such as the frame of a truck, or the frame of a towing trailer. The power box can be removably mounted on the front of the mixing box. The releasable drive connection means between the power box and the auger means allows the power box to be separated from the auger means and removed from the mixing box for servicing, repair, or replacement. This can be done with a minimum of time and labor. The movable power box also provides access to the auger means. The auger means can be removed from the mixing box with the removal of a minimum of parts and without disassembling major portions of the mixing box. This allows the mixing apparatus to be serviced and repaired with a minimum of time, cost, and labor.

The mixing structure in the mixing box utilizes a pair of augers and a pair of paddle conveyors that are concurrently rotated in opposite directions to move feed material in concurrent and opposite moving longitudinal elongated mixing paths. The lower augers move material to separate boiling areas whereby the material in the box is boiled upwardly adjacent opposite ends of the chamber to enhance the mixing and the blending of the material. The mixing and blending of the material in the mixing box chamber is accomplished with a relatively short period of time with a minimum of horsepower.

IN THE DRAWINGS

FIG. 1 is a side elevational view of the material mixing apparatus of the invention located in operative association with a loading conveyor and an unloading conveyor;

FIG. 2 is a top plan view of the mixing apparatus of FIG. 1;

FIG. 3 is an enlarged sectional view taken along the line 3—3 of FIG. 1;

FIG. 4 is a sectional view taken along the line 4—4 of FIG. 1;

FIG. 5 is an enlarged foreshortened sectional view taken along the line 5—5 of FIG. 1;

FIG. 6 is an enlarged sectional view taken along the line 6—6 of FIG. 4;

FIG. 7 is an enlarged sectional view taken along the line 7—7 of FIG. 4;

FIG. 8 is an enlarged sectional view taken along the line 8—8 of FIG. 5;

FIG. 10 is an enlarged top plan view of the drive motor and mount therefor for the drive box assembly;

FIG. 11 is an enlarged sectional view taken along line 11—11 of FIG. 10;

FIG. 12 is a perspective view of the pivot structure mounting the drive box assembly on the mixer box;

FIG. 13 is a diagrammatic view of the chain and sprocket power transmission of the drive box assembly;

DESCRIPTION OF PREFERRED EMBODIMENT

Figure 14:
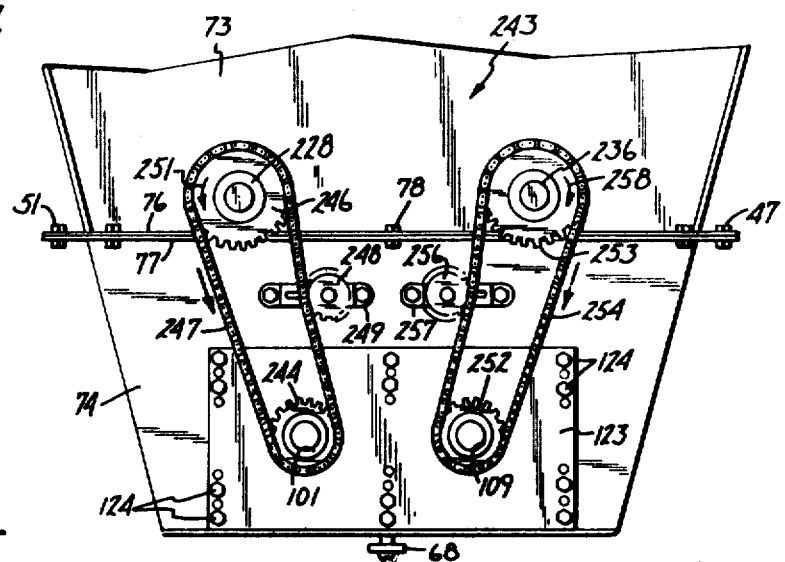
FIG. 14 is a rear elevational view of the mixing apparatus.

Referring to FIG. 1, there is shown an apparatus for mixing particulate material, commonly known as a mixer, indicated generally at 20. The particulate material includes, but is not limited to, animal feeds, as grains, silage, haylage, and the like. Mixer 20 is supported on a plurality of blocks or pedestals 21 above a stationary support or floor 22. Weight-sensing units 23 mounted on top of blocks 21 secured to lower portions of the mixer 20 are operable to sense the weight of the material in the mixer. The weight-sensing units are connected with suitable electrical conductors to a control box 24. The control box 24 has the controls which power the weight-sensing units and scale indicators showing the weights of the material added to or discharged from mixer 20. Weight-sensing units 23 are auxilliary or accessory equipment which is not required for the operation of mixer 20. Mixer 20 can be mounted on any suitable supporting structure, including a transport vehicle, such as the frame of a truck or a trailer, including, but not limited to, a gooseneck trailer. Mixer 20 is hereinafter described as a stationary structure that can be located in a relatively small room, such as a feed room used by herdspersons for feeding dairy and beef cattle.

A feeding or input conveyor 26 extends upwardly over the top of mixer 20. The discharge end of conveyor 26 is supported with an upright stand 27 on floor 22. Conveyor 26 operates to discharge material 28 into the top of mixer 20. An output conveyor 29 has a loading hopper 31 located below mixer 29 for receiving the mixed material 32. Conveyor 29 operates to carry the mixed material from hopper 31 to a desired location, such as a bunk feeder or transport vehicle. The mixer 20 is operable to mix or blend a plurality of materials or rations together to provide a thoroughly mixed and blended feed material that is carried by the discharge conveyor 29 to a desired location.

Referring to FIG. 3, mixer 20 has an elongated open top hopper or box 36 having a chamber 37 for accommodating the material to be mixed. Box 36 has upper side walls 39 and 41 joined to lower side walls 42 and 43. Side wall 41 has a generally horizontal outwardly directed flange 44 located in engagement with a flange 46 on side wall 42. Connectors 47, such as nut and bolt assemblies, secure flanges 44 and 46 together. Side wall 42 has a horizontal flange 48 located in engagement with the flange 49 on side wall 43. Connectors 51, as nut and bolt assemblies, secure the flanges 48 and 49 together.

Lower longitudinal sections of side walls 42 and 43 are joined to a bottom wall indicated generally at 54. A longitudinal plate or reinforcing rib 52 is secured with welds 53 to the outside of the lower section of side wall 42. A like longitudinal plate or reinforcing rib 59 is secured with welds 60 to the outside of the lower section of side wall 43. Ribs 52 and 59 extend the full length of box 36. Bottom wall 54 has two longitudinal concave trough sections 56 and 57. The concave sections 56 and 57 are joined together with a longitudinal center portion or rib 58.

The outer longitudinal edge of bottom section 56 joins with side wall 42 at a longitudinal break line ridge or bend section 56A. Section 56A is the apex of an obtuse angle between side wall 42 and concave curved bottom wall section 56. A second longitudinal break or bend section 57A joins side wall 42 with bottom wall section 57. Section 57A is the apex of an obtuse angle between side wall 43 and concave curved bottom wall section 57. Sections 56A and 57A extend the length of adjacent augers 96 and 97 and are located in a horizontal plane that intersects the longitudinal or rotational axes of the augers. Sections 56A and 57A and the concave curved trough sections 56 and 57 prevent a build-up of feed or wedging of feed between the trough sections 56 and 57 and the augers 96 and 97 and minimize wrapping of feed, as haylage, around the augers.

Figure 15:
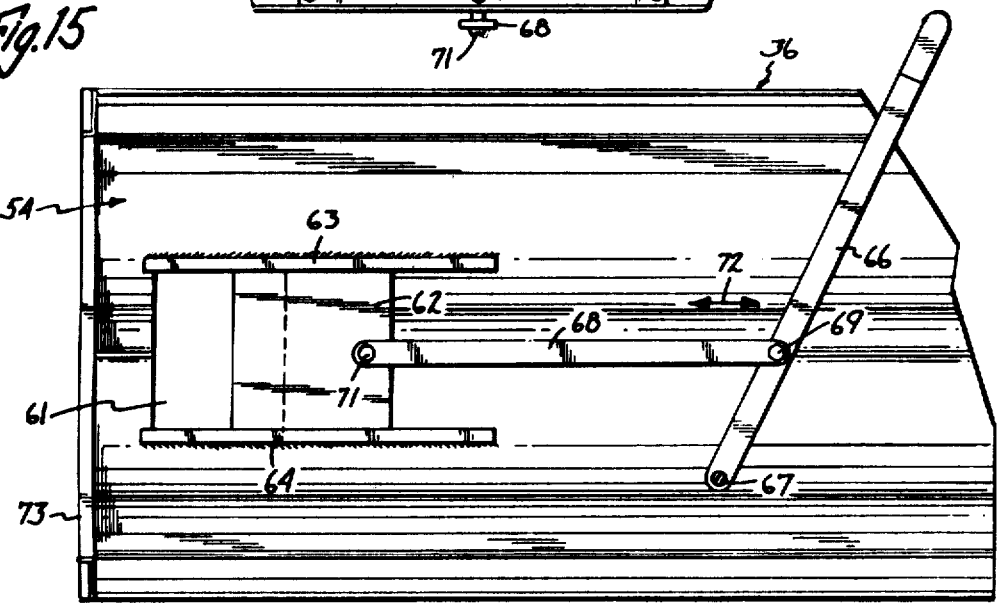
FIG. 15 is a bottom view of the material discharge opening in the bottom of the mixer box.

As shown in FIGS. 5 and 15, bottom wall 54 has a central discharge opening or hole 61 allowing mixed material 32 to flow into the discharge conveyor hopper 31. A movable door 62 is used to close the opening 61 during the mixing process. Door 62 is slidably mounted on a pair of L-shaped rails 63 and 64 secured by welds or the like to the bottom portions of the arcuate sections 56 and 57. A hand-operated lever 66 is used to move door 62 to its open and closed positions. A pivot 67 pivotally mounts the inner end of lever 66 to the bottom wall 54. An intermediate portion of lever 66 is pivotally connected to a link 68 with a pivot member 69. The opposite end of link 68 is pivotally connected with a pivot member 71 to door 62. The outer end of lever 66 is located below the side wall in a position where it can be conveniently operated. The lever 66 pivots in the direction of the arrow 72 to selectively open and close door 62.

As shown in FIGS. 1, 5, and 14, end walls 73 and 74 having adjacent transverse flanges 76 and 77 connected together with fasteners 78 enclose the left end of box 36. The end wall sections 73 and 74 are attached to the side walls 39, 41, 42, and 43 and bottom wall 54 with fasteners, such as nut and bolt assemblies (not shown). The opposite or right end of box 36 is closed with end wall sections 79 and 81 having cooperating flanges 82 that are secured together with fasteners 83, such as nut and bolt assemblies. Wall sections 79 and 81 are secured to the side wall sections 39, 41, 42, and 43 and bottom wall 54 to complete the box. The individual parts of the side wall sections 39, 41, 42, and 43 and bottom wall 54 and end wall sections 73, 74, 79, and 81 are each of a size so that they can be moved and installed in a limited space having a narrow or restricted access. The individual wall sections and bottom are secured together with nut and bolt assemblies to form a complete open top box having mixing chamber 37.

Referring to FIG. 2, upper side walls 41 and 42 have outwardly directed top lips or flanges 84 and 86 that extend to opposite ends of top lips or flanges 87 and 88 on the upper sections of end walls 73 and 79, respectively. An open grid assembly indicated generally at 89 is located over the open top of box 36 providing a protective barrier preventing large objects from entering chamber 37. Open grid assembly 89 comprises a plurality of side-by-side transverse members or tubes 91 and a plurality of longitudinal members or tubes 92. As shown in FIG. 3, the transverse members have opposite flattened ends located on top of flanges 84 and 86 and secured thereto with fasteners 93, such as nut and bolt assemblies. The opposite ends of the longitudinal members 92 have opposite flattened ends that are joined to the flanges 87 and 88 with fasteners 93.

Referring to FIGS. 3 and 5, a material mixing apparatus or means indicated generally at 94 is located within chamber 37 operable to move the material in the chamber longitudinally in a circuitous path hereinafter described. Material mixing means 94 has a pair of bottom augers 96 and 97 extended along concave sections 56 and 57 of bottom wall 54 and a pair of paddle conveyors 98 and 99 located above augers 96 and 97 and generally in the mid-section of chamber 37. Conveyors 98 and 99 function to move the material in chamber 36 in directions opposite the directions that the material is moved by augers 96 and 97, respectively.

Auger 96 has a longitudinal tubular shaft 101. A first continuous helical flight 102 is secured to shaft 101 and extends from end wall 79 to a pair of paddles 103 and 104 secured to opposite portions of shaft 101. A short second helical flight 106 is secured to shaft 101 between paddles 103 and 104 and end wall 73. Helical flight 106 has a twist or turn that is opposite the turn of helical flight 102. When auger 96 is rotated, it moves the material in the direction of the arrow 107 and helical flight 106 moves the material away from wall 73 in the direction of arrow 108. The material moves toward the area of the auger containing paddles 103 and 104. Paddles 103 and 104 function to move the material in an upward direction toward conveyor 98. The area between the adjacent ends of flights 102 and 106 contain paddles 103 and 104 is a first boil area wherein the material moves axially toward each other and rolls in an upward direction to effect a mixing action.

Auger 97 has a longitudinal tubular shaft 109 secured to a first continuous helical flight 111. Flight 111 extends from end wall 73 continuously to a pair of paddles 112 and 113 secured to opposite sides of shaft 109. A short helical flight 114 extends between paddles 112 and 113 and end wall 79. Helical flight 114 has a turn or twist that is opposite the turn of helical flight 111. when auger 97 is rotated, helical flight 111 moves material in the direction of the arrow 116 away from wall 73. Helical flight 114 moves material in the direction of the arrow 117 away from wall 79. The flights 111 and 114 feed the material into each other in the area of convergence or second boil area containing paddles 112 and 113. Paddles 112 and 113 function to move material in an upward direction toward conveyor 99. Augers 96 and 97 are identical in structure, with auger 97 being located end-to-end relative to auger 96.

End wall 73 has a pair of holes 118 and 119 that are covered with a plate 123. Bearings 121 and 122 are mounted on plate 123 and rotatably support the ends of the shafts 101 and 109, respectively. Holes 118 and 119 are of a size larger than the diameter of the helical flights 102, 106 and 111, 114 so that the augers 96 and 97 can be removed from the box 36 by removing plate 103 and sliding augers 96 and 97 through holes 118 and 119, respectively. Plate 123 is connected to end wall 23 with a plurality of nut and bolt fasteners 124. As shown in FIG. 15, plate 123 has a plurality of holes for accommodating fasteners so that the up and down position or elevation of plate 123 on end wall 74 can be adjusted. This adjusts the clearance of augers 96 and 97 relative to trough sections 56 and 57.

End wall 79 has a pair of holes 126 and 127 that are closed with a pair of plates 128 and 129. A plurality of fasteners 131 secure plates 128 and 129 to end wall 79. As shown in FIG. 6, plates 128 and 129 are located adjacent upper and lower sides of shafts 101 and 109 and have openings 132 and 133 allowing shafts 101 and 109 to project through the outside of the plates 128 and 129.

Augers 96 and 97 are drivably connected to a power transmission unit or power box indicated generally at 134. Releasable drive connections 136 and 137 couple power box 134 to auger shafts 101 and 109, respectively. The releasable drive connections 136 and 137, in addition to transmitting power from power box 134 to augers 96 and 97, allow the augers to flex and bend in use without transmitting large flexure and bending forces to the bearings and power transmission structure in the power box. The power box can be uncoupled from augers 96 and 97 as drive connections 136 and 137 are releasable. This is done without removing or releasing the drive connections from the augers or power box 134.

Power box 134 has a housing 138 surrounding an enclosed chamber 139 accommodating lubricant, as oil, for lubricating the drive mechanism located within the housing hereinafter described. As shown in FIG. 7, an angle iron or bar 141 is secured to and extends across the front of housing 138. Bar 141 has holes 142 and 143 at its opposite ends. First bracket 144 having a hole 146 aligned with hole 142 is secured to the lower portion of the left side of housing 138, as seen in FIG. 7. A second bracket 147 having a hole 148 aligned with hole 143 is secured to the lower portion of the right side of housing 138. Bar 141 and brackets 144 and 148 are used to pivotally mount power box 134 to the front end wall 79 of box 36. As shown in FIG. 6, a transverse member or angle iron 149 extends across end wall 79 and is secured thereto with a plurality of fasteners 151, as nuts and bolts. Angle iron 149 has holes 152 and 153 at its opposite ends. Located below one end of angle iron 149 is a first outwardly directed arm 154 secured to front wall 79 with a plurality of fasteners 156. Arm 154 has a hole 157 aligned with hole 152. A second arm 158 extends outwardly from the right side of end wall 79, as shown in FIG. 6. A plurality of fasteners 159 secure arm 158 to end wall 79. Arm 158 has a hole 161 vertically aligned with the hole 153. Member 149 and arms 154 and 158 are attached to end wall 81 in selected vertical positions. These vertical positions can be adjusted to adjust the clearance of augers 96 and 97 relative to trough sections 56 and 57.

Referring to FIG. 12, a pair of pivot members 162 and 163, as nut and bolt assemblies, pivotally connect power box 134 to end wall 81. Pivot members 162 and 163 extend through the adjacent holes in the adjacent ends of bar 141, angle iron 149, and bracket 144 and arm 158. A second pair of pivot members 164 hold the opposite end of the housing 138 adjacent the end wall 81. As shown in FIG. 4, power box 134 can swing about the upright axis of the pivot members 162 and 163 away from end wall 81 in the direction of the arrow 166. This can be accomplished after the pivot members 164 have been released and removed. The releasable drive connections 136 and 137 allow power box 134 to uncouple from augers 96 and 97. Power box 134 can be swung in an opposite direction, as indicated by the arrow 167, by releasing pivot members 162 and 163 and pivoting the box about the upright axis of pivot members 164 and 165. Releasable drive connections 136 and 137 automatically decouple when power box 134 is pivoted in either direction away from end wall 81. Releasable drive connections 136 and 137 also allow power box 134 to be removed from the wall 79. This is done by removing all the pivot members 162, 163 and 164, 165. The power box 134 and its drive motor 187 are not disconnected nor disassembled to pivot the power box to release the drive connections 136 and 137 and couple the drive connections. It is not necessary to remove the power box 134 from mixer box 36 to remove augers 96 and 97 through holes 126 and 127 in end wall 79. Power box 134 can be swung to a position where it does not interfere with the removal of plates 128 and 129 from end wall 79 and the pulling of augers 96 and 97 through holes 126 and 127.

The structure of the releasable drive connections 136 and 137 are shown in detail in FIGS. 6, 7, and 8. Drive connections 136 and 137 are identical in structure and function. Drive connection 136 is shown in detail in FIG. 8. The corresponding parts of drive connection 137 that correspond to the parts of the drive connection 136 have the same reference numerals with the suffix A.

Drive connection 136 has a first or driven spider 168 secured by welds or the like to the outer end of auger shaft 101. Spider 168 has four outwardly directed dovetail shaped arms 169 circumferentially spaced at 90 degree intervals. Each arm 169 has outwardly diverging side edges 171 and 172. As shown in FIG. 8, arms 169 are angularly inclined in a forward or outward direction away from the end wall 79. The angle of inclination is about 10 degrees. Other angles can be used. A second or drive spider indicated generally at 173 is secured to a power output or drive shaft 178 of power box 134. A bearing located on the inside of housing 138 rotatably mounts shaft 178 on housing 138. Drive spider 173 has four outwardly directed arms 174. Arms 174 have outwardly directed diverging side edges 176 and 177. Adjacent arms are circumferentially spaced from each other at approximately 90 degrees and are of a size to fit between the circumferential spaces between the adjacent arms 169 of first spider 168. As shown in FIG. 8, arms 174 are inclined or angularly disposed away from housing 138. Arms 174 and arms 169 are angularly inclined in opposite directions so that adjacent side edges 172 and 176 of each adjacent arm 169 and 174 will drivably engage each other so that the power from shaft 178 is transmitted through spiders 173 and 168 to auger shaft 101.

Shaft 178 has a forward or pilot end 179 that extends into passage 183 of shaft 101. The pilot end 179 of shaft 178 maintains spiders 168 and 173 in driving alignment with each other and supports the end of auger shaft 101, since this end of auger shaft 101 is not rotatably carried in a bearing. Pilot end 179 of shaft 178 has a loose fit within passage 173 allowing the auger shaft to flex and bend without transmitting large deflecting forces on bearing 181. Spiders 168 and 173 permit relative movement between each other in a longitudinal direction without releasing the drive connection between the spiders.

Figure 9:
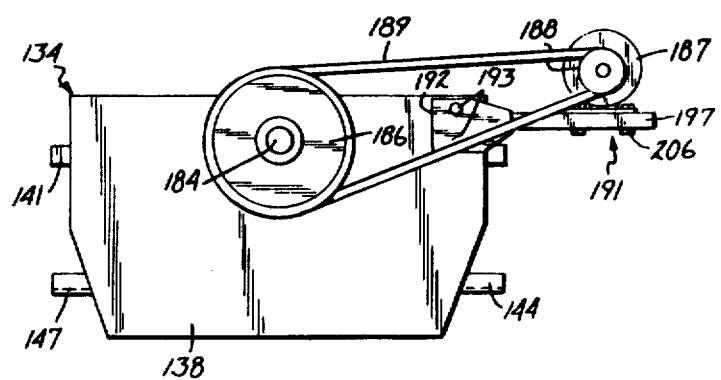
FIG. 9 is a front elevational view of the drive box assembly mounted on the front end of the mixer box.

As shown in FIG. 9, power box 134 has a power input shaft 184 drivably secured to a pulley 186. A motor, as an electric motor 187, supplies power to rotate sprocket 186. The motor 187 has a drive pulley 188. A V-belt 189 drivably connects pulleys 186 and 188. Motor 187 is attached to the side of housing 183 with a motor mount indicated generally at 191 in FIG. 10. Motor mount 191 is adapted to be mounted on either side of housing 183. Mount 191 includes a plate 192 secured to the side of housing 183 with a plurality of bolts 193. A square member 194 attached to plate 192 extends along the end of housing 183. A first square tube 196 is telescoped onto square member 194. An outwardly directed arm 197 having a central longitudinal linear slot 198 is secured to tube 196. A second square tube 199 is telescoped on square member 194. A second elongated arm 201 having a linear longitudinal slot 202 is secured to tube 199. A bracket 203 having a square slot 205 accommodating square member 194 is located between tube 196 and tube 199 and secured to housing 183 with fasteners 204. Arms 197 and 201 are located in generally the same horizontal plane and extend outwardly from housing 183. Motor 186 is adjustably mounted on arms 197 and 201 along the length thereof with a plurality of nut and bolt assemblies 206 which extend through slots 198 and 202. Nut and bolt assemblies 206 clamp the motor legs to arms 197 and 201 in a selected position along the length of the arms. Motor 187 is located on arms 197 and 201 in a position to provide for the proper tension of endless chain 189. Sleeve or square tube 199 can be adjustably positioned along the square member 194 to accommodate for different types of motors and support legs or structure of the motors. For example, motor 186 may have an extended length with support structures on the extended end of the motor. Arm 201 would then be moved to the right, as shown in FIG. 10, to increase the distance between the longitudinal slots 198 and 202 to accommodate the motor leg or mount structure.

Referring to FIG. 13, there is shown the diagram of the power transmission of the power box 134. The power transmission has a first chain drive indicated generally at 207 that takes the power from power input shaft 184. A small sprocket 208 is mounted on shaft 184 and a large sprocket 209 is mounted on a jack shaft 211. An endless chain 212 drivably connects the sprockets 208 and 209. Jack shaft 211 is drivably connected to a second jack shaft 217 on the right side of housing 138 with a second chain drive 213. A small sprocket 214 is drivably connected to shaft 211. A large sprocket 216 is drivably connected to shaft 217. An endless chain 218 transmits power from sprocket 214 to large sprocket 216. Jack shaft 217 is drivably connected with a third chain drive 219 and power output shafts 178 and 178A. Large sprockets 222 and 223 are drivably secured to the output shafts 178 and 178A, respectively. An endless chain 226 drivably connects the small sprocket 221 with the large sprockets 222 and 223. The chain also runs over an idler sprocket 224. The chain 226 extends around the sprocket 223 to rotate the sprocket in a counterclockwise direction and over an arcuate portion of sprocket 222 to drive sprocket 222 in a clockwise direction. In other words, output shafts 178 and 178A are driven in opposite directions at substantially the same speeds. The chain drives 207, 213, and 129 are entirely located in the chamber 139 of housing 138. Suitable lubricant 227, such as transmission oil, is located in the bottom of chamber 239. The bearings, including bearing 181, for rotatably mounting the shafts 184, 211, 217, and 178 and 178A on housing 138, are located within the chamber 139. The lubricant 227 lubricates the chain, as well as the bearings. The top of housing 138 is closed with a generally flat cover or plate 140. Releasable fasteners, as bolts, function to secure plate 140 to the top of ends and side walls of housing 138. The cover 140 can be removed to provide access into chamber 139 to facilitate maintenance and repair of the chain and sprocket drives.

Returning to FIGS. 3 and 4, conveyor 98 has a longitudinal shaft 228 rotatably mounted on bearings 229 and 231 attached to the end walls 74 and 81, respectively. A plurality of pie-shaped members or arcuate segment paddles 232 are secured to the shaft 228. The paddles 232 have forward surfaces that extend in a helical angle. Paddles 232 are located in series in a circumferential path around shaft 228. Each paddle 232 is connected to a rear gusset 233 to reinforce the paddle and its connection to shaft 228. Conveyor 98, as it rotates, moves the material in chamber 36 in the direction of the arrow 234, which is opposite the direction of movement of the material by auger flight 102 of auger 96. Paddles 232 of the conveyor 98 pick up the material boiled upwardly by paddles 103 and 104 and flights 102 and 106 of auger 96. The material is conveyed in a generally horizontal direction from end wall 74 to end wall 81, as shown by the arrow 234 in FIG. 4. Helical flight 102 moves material away from wall 79 so that the material moved by the conveyor 98 will feed into the inlet of conveyor flight 102 whereby the auger 94 and conveyor 98 work together to move the material in an endless longitudinal loop-like path.

Conveyor 99 has a longitudinal shaft 236 rotatably mounted on bearings 237 and 238 secured to end walls 74 and 81, respectively. Shaft 236 is extended parallel to shaft 228 and carries a plurality of pie-shaped members or arcuate segment paddles 239. Paddles 239 are circumferentially oriented about the shaft 239 and follow an interrupted helical path. Each paddle is attached to a gusset 241 which reinforces the paddle and the connection of the paddle to shaft 236. The conveyor 99, as it rotates, moves the material in the direction of the arrow 242. This is opposite the direction of movement of the material by the helical flight 111 of auger 97, as shown by the arrow 116 in FIG. 5. Conveyor 99 picks up the material boiled upwardly by auger paddles 112 and 113 and flights 111 and 114 and moves the material from end wall 79 toward end wall 73. This is opposite the direction of movement of paddle conveyor 78 and opposite the direction of movement of the material by helical flight 111 of auger 97. This produces a longitudinal mixing and interaction between the oppositely moving material in the upper section of the chamber 37 caused by paddle conveyors 98 and 99. The mixing is also achieved by the movement of the material in a generally oblong or loop-like longitudinal path established by helical flight 111 of auger 97 and the paddle conveyor 99. The inclined forward surfaces of the paddles 232 and 239, in addition to moving the material in longitudinal directions, provide the material with radial outward components so that some of the material moves in outward directions away from conveyors 98 and 99 and thereby enhances the mixing and blending of the materials in chamber 37.

Referring to FIG. 14, the power transmitting structure for rotating the paddle conveyors 98 and 99 via augers 96 and 97 is indicated generally at 243. The power transmission structure 243 is two separate drives for rotating conveyors 98 and 99 in opposite directions at a speed slightly slower than the rotation of the augers 96 and 97. A sprocket 244 is mounted on the outer end of auger shaft 101 in alignment with a sprocket 246 on the end of conveyor shaft 228. An endless link chain 247 drivably connects the sprockets 244 and 246. A chain tension roller 248 engages the return run of chain 247. A roller 248 is adjustably mounted on a bracket 249 secured to the end wall 74. The chain 247 drives sprocket 246 and conveyor 96 in a counterclockwise direction, as indicated by the arrow 251.

The second power transmission means of the power transmitting structure 243 has a sprocket 252 mounted on the end of auger shaft 109. Sprocket 252 is aligned with a sprocket 253 mounted on the end of conveyor shaft 236. An endless chain 254 connects sprocket 252 with sprocket 253. A chain tensioning roller 256 engages chain 254 to maintain proper tension. Roller 256 is adjustably mounted on the bracket 256 attached to end wall 74. The chain 254 on rotation of the auger 97 rotates sprocket 253 and conveyor 99 in a clockwise direction, as indicated by the arrow 258. The sprockets 246 and 253 are larger than the drive sprockets 244 and 252 so that the conveyors 98 and 99 will rotate at a slower rpm than the augers 96 and 97. As shown in FIGS. 1 and 2, the power transmitting structure for rotating the paddle conveyors 98 and 99 is enclosed within a cover or shield 259 mounted on the end walls 73 and 74.

In use, mixer 20 is assembled in a location, such as a feed room. The parts of the mixer, such as the side walls, end walls, bottom walls, power box, open grid assembly 89, are of a size that can be conveniently moved through relatively small access openings and assembled in a confined area. Power box 134 can be selectively mounted on either end of the mixing box 36. The motor mount 191 for the motor 187 for driving the power box can be mounted on either the right or left side of the power box, as shown in FIG. 2. These structures allow mixer 20 to be assembled and used in a relatively confined area and allow the mixer to be located in a desired position in the area.

The material is loaded into the mixing chamber 37 with an input conveyor 26. The material 28 flows through the open grid assembly 89 into mixing chamber 37. Several types of material may be loaded into chamber 37 with mixing conveyor 37. In addition, additional material can be poured into the chamber 37, such as concentrates and other feed materials that are to be mixed with bulk or roughage feed-type materials. The control box 24 having the weight indicators is used to determine the ratios of the rations according to the feeding program of the animals. The lever 68 is in a position wherein the door 62 closes the discharge opening 61 in the bottom wall 54. The motor 187 is operated to drive power box 134. The power from the power box is transmitted to the releasable drive couplings 136 and 137 to augers 96 and 97, respectively, and thereby rotate the augers in opposite directions. Augers 96 and 97 move the material in the bottom portion of the chamber 37 in the direction of the arrows 107, 108, 116, and 117, as seen in FIG. 5.

Power transmission structure 243, as shown in detail in FIG. 14, drivably connects auger shafts 101 to paddle conveyor 98 and auger shaft 109 to paddle conveyor 99. Paddle conveyors 98 and 99 are rotated in opposite directions to move the material in the upper portion of chamber 37 in the directions of the arrows 134 and 136, as shown in FIG. 4. This movement is opposite to each other and is opposite to the movement of the materials by augers 96 and 97, respectively. The mixing of the material in chamber 31 results in a continuous mixing and blending action that produces a consistent mixture of the roughages and concentrates of the several materials that are placed into mixing chamber 37.

After the material in chamber 37 is thoroughly mixed by augers 96 and 97 and paddle conveyors 98 and 99, the material is discharged through discharge opening 61 into discharge conveyor 29. Lever 66 is moved in a direction to open door 62 and thereby open discharge opening 61. As shown in FIG. 5, discharge opening 61 is located adjacent paddles 103 and 104 of auger 96. Paddles 103 and 104, as they rotate with auger 96, move the material in the bottom portion of chamber 37 through opening 161 into conveyor 29. Flights 102 and 106 continuously feed the material towards the paddles so that chamber 37 can be emptied in a relatively short period of time.

While there has been shown and described a preferred embodiment of the mixing apparatus of the invention, it is understood that changes in the size, structure, arrangement of structure, power transmitting means, loading and unloading conveyors, may be made by those skilled in the art without departing from the invention. The invention is defined in the following Claims.

The embodiments of the invention in which an exclusive property or privilege is claimed are defined as follows:

1. An apparatus for driving a movable means, said movable means including driven shaft means comprising: power means having drive shaft means for driving the drive shaft means, releasable means drivably connecting the drive shaft of the power means with the driven shaft means whereby the power means rotates the driven shaft means, said releasable means includes first means having at least one first arm secured to the shaft means, and second means having at least one second arm secured to and moved by the drive shaft means to the power means, one of said shaft means having an axial passage having an open end, and the other of said shaft means having projection means adapted to fit into the axial passage through the open end thereof to support said one of said shaft means on the other of said shaft means, said first and second arms being engageable with each other to transmit power from the power means to the driven shaft means when the projection means is located in said axial passage.

2. The apparatus of claim 1 wherein: said first means has a plurality of arcuately spaced first arms, and said second means has a plurality of arcuately spaced second arms, adjacent first and second arms being engageable with each other to transmit power from the power means to the movable means.

3. The apparatus of claim 1 wherein: the first arm and second arm each have side edges and project in radial outward directions, said first and second arms being inclined outwardly in opposite directions so that the first arm extends adjacent the second arm and the adjacent side edges of the adjacent first and second arms engage each other.

4. The apparatus of claim 1 including: support means, means mounting the power means on the support means, said means mounting the power means on the support means including pivot means allowing the power means to swing away from said movable means to release the releasable means.

5. The apparatus of claim 4 wherein: the power means has a housing having a chamber, power input shaft means rotatably mounted on the housing, power output shaft means rotatably mounted on the housing, and power transmission means located in said chamber drivably connecting the input shaft means to the output shaft means, and motor means for driving the input shaft means, said releasable means being connected to the output shaft means.

6. An apparatus for driving a plurality of rotatable means comprising: power means having a plurality of drive shaft means for rotating the rotatable means, a plurality of releasable drive means connecting the drive shaft means of the power means with the rotatable means whereby the power means rotates the rotatable means, each releasable drive means comprising first means having at least one first arm secured to a rotatable means, and second means having at least one second arm secured to and moved by a drive shaft means of the power means, one of said first and second means having projection means and the other of said first and second means having an axial passage with an open end to accommodate the projection means to support said one of the first and second means on the other of said first and second means, said first and second arms being engageable with each other to transmit power from the power means to the rotatable means to rotate said rotatable means when the projection means is located in said axial passage.

7. The apparatus of claim 6 wherein: said first means has a plurality of arcuately spaced first arms, and said second means has a plurality of arcuately spaced second arms, adjacent first and second arms being engageable with each other to transmit power from the power means to the movable means.

8. The apparatus of claim 7 wherein: the first arms and second arms each have side edges and project in radial outward directions, said first and second arms being inclined outwardly in opposite directions so that the first arms extend between the second arms and the adjacent side edges of the adjacent first and second arms engage each other.

9. The apparatus of claim 6 wherein: each of said rotatable means has an axial passage and each of said drive shaft means has projection means adapted to fit into an axial passage through the open end thereof to support the rotatable means on said drive shaft means.

10. The apparatus of claim 6 wherein: said plurality of rotatable means comprises a pair of driven shaft means and said drive shaft means comprises a pair of drive shaft means axially aligned with the driven shaft means.

11. The apparatus of claim 10 wherein: each of said driven shaft means has an axial passage and each of said drive shaft means has projection means adapted to be located in a passage through the open end thereof when the first arms and second arms are located in driving relation with each other.

* * * * *